Figure 1:
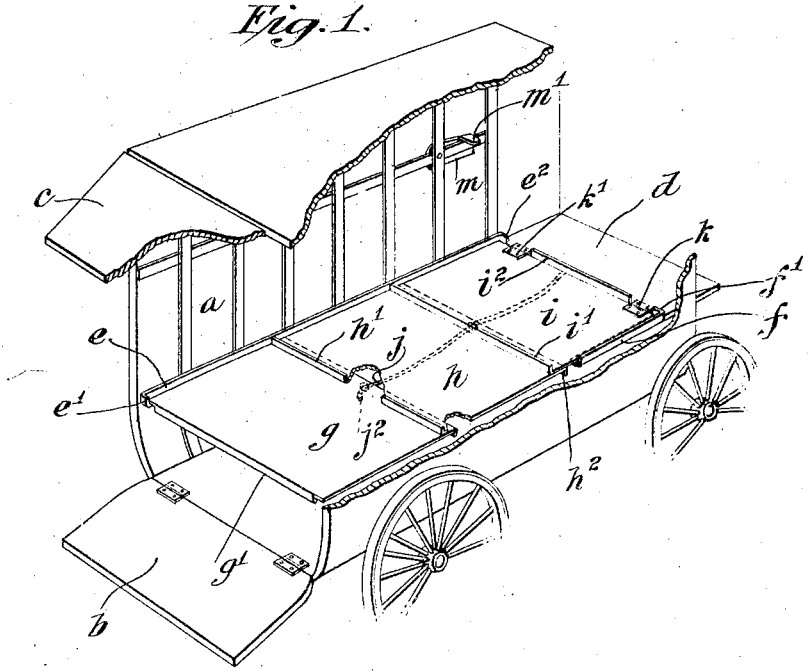

Aug. 7, 1928.

C. W. PEELLE 1,680,027

DELIVERY-WAGON

Filed Dec. 12, 1924

INVENTOR
Charles W Peelle
BY
Frank P Wentworth
his ATTORNEY.

Patented Aug. 7, 1928.

1,680,027

UNITED STATES PATENT OFFICE.

CHARLES W. PEELLE, OF NEW YORK, N. Y., ASSIGNOR TO THE PEELLE COMPANY, OF BROOKLYN, NEW YORK, A CORPORATION OF NEW YORK.

DELIVERY WAGON.

Application filed December 12, 1924. Serial No. 755,444.

My invention relates to delivery wagons, and more particularly to a construction thereof by which the loading and unloading of the wagon is facilitated.

In the transportation of bread and other bakery products, it is not only essential that the delivery wagons be loaded to their full capacity in order to ensure economy in the delivery of such products, but the construction of the wagon must be such as to ensure sanitary conditions both in the wagon and in the handling of the goods.

Bread, rolls and cakes, while stored in boxes before being placed upon the delivery wagons, are, when making deliveries commonly removed from these boxes and placed in baskets of a smaller capacity than the box. In some instances, the wrapped bread or other products are piled directly in the wagon without using such boxes.

For loading and unloading the wagon, it is necessary to provide a wagon top which is so constructed as to facilitate the placing of the bread or the boxes in every portion thereof, while affording independent supports for different superimposed rows of bread or boxes.

Heretofore, it has been the common practice to provide the wagon top with side cleats, and place upon these cleats wooden planks, inserted and removed from the wagon as required or as not required. The use of these planks however, has serious objections, since they are frequently lost so as not to be available when required, and in unloading a wagon the drivers sometimes place these planks upon sidewalks or streets, or in other unsanitary places, so that their subsequent use is attended with likelihood of spoilage to food stuffs subsequently packed thereon.

With the above conditions in mind, I have devised a delivery wagon embodying therein a supporting structure so constructed as to form an inseparable part of the wagon top while being capable of being extended or collapsed in a manner to permit access to every portion of the wagon when loading and unloading same. The construction of this supporting structure is such, that it may be readily kept clean, and be sufficiently rigid to support any load required of it, and may be partially extended or collapsed without interfering with any part of the load supported by the structure. Furthermore, if it is not desired to use the structure, it may, in its entirety, be so positioned as to leave the entire body of the wagon free and clear of obstruction, this condition also being utilized to facilitate the loading of the wagon close to the front of the body.

The invention consists primarily in a delivery wagon embodying therein a body having a closed bottom, sides and top, runways extending horizontally from adjacent the front to adjacent the rear of said body, above the bottom and within and adjacent opposite sides thereof, means for supporting a load above the bottom of the wagon body comprising a plurality of flat plates slidable upon said runways, each plate overlapping and resting upon the adjacent plate toward the rear of the wagon body, a flexible member attached to the front of the wagon body and engaging said plates respectively, whereby movement of the rearward of said plates rearwardly of the wagon body will cause movement of the adjacent plate, and a flat plate nonslidably supported within the wagon body, said flexible member preventing removal of said slidable plates and permitting them to be telescoped in relation to each other and to said nonslidable plate; and in such other novel features of construction and combination of parts as are hereinafter set forth and described, and more particularly pointed out in the claims hereto appended.

Figure 2:
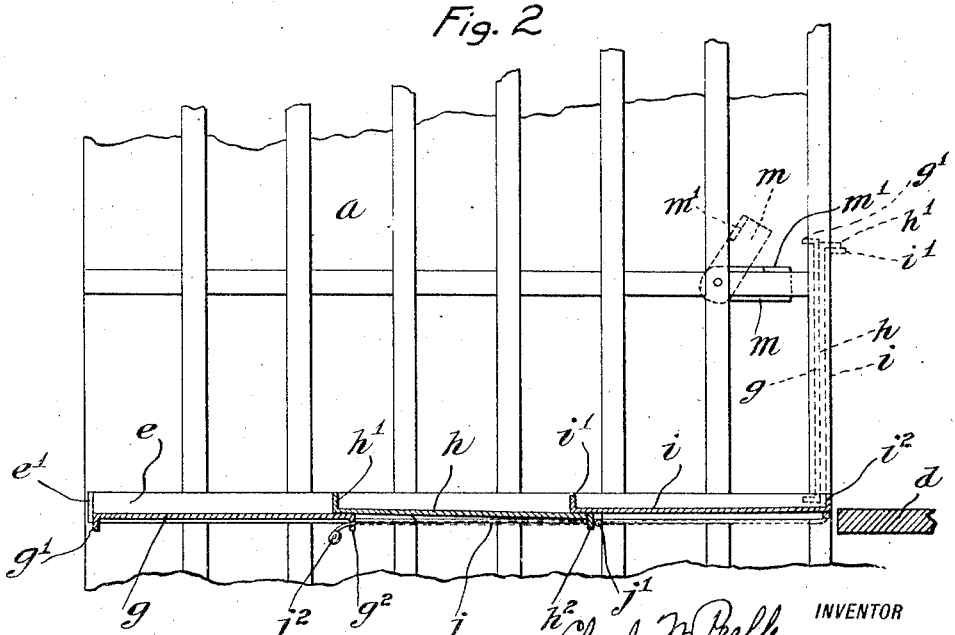

Referring the the drawings,

Fig. 1 is a perspective view of a delivery wagon embodying my invention, portions of the top being broken away to disclose the interior construction thereof; and Fig. 2 is a vertical section of the wagon top upon a larger scale.

Like letters refer to like parts in both of said views.

In the embodiment of the invention shown in the drawings, $a$ indicates the body of a delivery wagon which may be of any desired construction, although ordinarily such wagons are provided with a hinged tail board $b$ and a hinged closure $c$ above said tail board. The seat of the driver is shown at $d$, and a partition in the rear of the seat may be used or not as desired.

Secured to the stanchions at opposite sides of the wagon body are horizontally extending runways $e$ and $f$ positioned above the wagon floor a distance sufficient to permit the storage of boxes below the level of said runways.

Each of these runways $e$ and $f$ is formed of a continuous length of light angle iron, the vertically extending flange being utilized for securing the runways to the stanchions of the wagon body, and the other flange extending horizontally inwardly of the wagon body, to form runways upon which suitable supporting plates are slidably mounted while forming a support for said slidable plates and also for a plate or plates having no movement along said runways. The horizontal flange of said angle irons $e$ and $f$ are cut away adjacent each end, and the vertical flange bent at an abrupt angle as indicated at $e'$ and $e^2$ to form stops which will prevent excess movement of said plates. A portion of the angle iron $f$ is broken away, thus disclosing but a single end $f''$ thus turned, it being understood that the rear end of said angle iron $f$ is formed in the same manner as the corresponding end of the angle iron $e$. The angle irons $e$ and $f$ are of a length to extend from adjacent the seat $d$ to adjacent the tail board $b$, thus forming supports for a substantially continuous transverse partition or shelving.

In the form of the invention shown, I employ three plates $g$, $h$ and $i$, two of which, $g$ and $h$, are slidable upon the runways, in relation to each other, and to the third plate $i$. The plate $h$, as to the edge thereof toward the rear of the wagon, overlaps and rests upon the plate $g$, and as to the edge thereof toward the plate $i$, passes beneath, or underlies, said plate $i$, thus permitting the plates $g$ and $h$ to be telescoped with relation to each other and to the plate $i$ to bring all of these plates within the compass of a single plate as the wagon is being unloaded, and permitting access of the driver to every portion of the wagon. This collapsing of the plate structure may be gradually accomplished as the load is removed from the wagon, and as access is required to different parts of the wagon body during unloading.

To impart rigidity to the extensible and collapsible plate structure without interfering in any way with the free movement of the separate plates, I form downturned flanges $g'$—$g^2$ along the forward and rear edges of the plate $g$. The plate $h$ is provided with and upturned flange $h'$ along the edge thereof adjacent the plate $g$, and a downturned flange $h^2$ along the edge thereof adjacent the plate $i$. The plate $i$ is provided with two upturned flanges $i'$—$i^2$. The opposite ends of the downturned flanges $g'$, $g^2$ and $h^2$ are cut away so that these flanges may slide freely between the inturned flanges of the angle irons $e$ and $f$.

By this construction, I not only impart rigidity to these plates, but the upturned flanges $h'$ and $i'$ by engagement with merchandise upon the plate $h$, prevent movement of this plate when it is desired to slide the plate $g$ thereunder.

This construction permits the plates $g$, $h$ and $i$ to be made of fairly light stock, while still having sufficient rigidity and strength to sustain any load which they may be called upon to bear.

In addition to the reinforcing effects secured by the flanges $g^2$ and $h^2$, I employ these flanges for the purpose of permanently connecting the plates $g$ and $h$ with each other, with the plate $i$, and with the wagon body, to prevent the removal of any of these plates and to maintain them in a proper relative position to ensure and permit the telescopic action above referred to. This means consists of a flexible member as the chain $j$ secured to the wagon body, carrying stops $j'$—$j^2$ adapted to engage the flange $h^2$ and the flange $g^2$ respectively. Said chain passes through openings in said flanges respectively.

By this construction, when extending the plate support within the wagon, as the plate $g$ moves a distance equaling the width of the plate $h$, the stop $j'$ engages the flange $h^2$ and draws the plate $h$ towards the rear with the plate $g$. When collapsing the support, however, this chain $j$ has no function. If desired, the chain $j$ may be used to draw the plates $g$ and $h$ toward the rear of the wagon body, with the plate $h$ overlaying the plate $g$.

The plate $i$ is hinged at $k$—$k'$ adjacent the seat $d$, its hinges being so set as to permit said plate to be turned upwardly, together with the plates $g$ and $h$, so as to expose the portion of the wagon body beneath the plate $i$ and permit the placing of boxes under said plate, or the use of the wagon for larger merchandise when so desired. The flange $i^2$ is cut away to accommodate the hinges $k$—$k'$.

Adjacent the forward end of the wagon, and pivotally mounted upon one of the stanchions, is a latch member $m$ having a tongue $m'$ projecting inwardly of the wagon so that it may be interposed in the path of movement of the plates $g$, $h$ and $i$, when the latter are folded upwardly as shown in dotted lines, Fig. 2, and thus prevent these plates from falling to upon the runways formed by the angle irons.

In loading a wagon embodying my invention, the plates $g$, $h$ and $i$ are telescoped, and, if desired, folded upwardly as indicated in dotted lines in Fig. 2. Boxes containing bread or other similar merchandise, are then placed upon the wagon floor below the space which will be occupied by the plate $i$. The plates $g$, $h$ and $i$ are then turned downwardly, the lock lever $m$ being raised so as to move the projection $m'$ thereof from the path of movement of said plates. Boxes are then piled upon the plate $i$, thus loading the vehicle from the floor to adjacent the top of the wagon body. Boxes are then loaded upon the floor of the wagon below the space which will be occupied by the plate $h$, and the plates $g$ and $h$ drawn toward the rear of the wagon by means of the chain $j$ until the plate $h$ is exposed to its full extent so as to permit the loading of boxes upon this plate. When the full load for this portion of the wagon has been placed in position, the plate $g$ is drawn toward the rear to the full extent, the enlargement or ball $j^2$ limiting the rearward movement of this plate. The final floor load is then slid along the floor of the wagon beneath this plate, although the boxes constituting this load may be placed upon the floor of the wagon before this plate $g$ is moved as above described. The loading is completed by placing boxes upon the plate $g$, before closing the tail board and the back upper cover.

This manner of loading permits the convenient handling of all of the merchandise, and the utilization of the entire capacity of the wagon body.

In unloading, the boxes are first removed from the plate $g$ and then this plate is telescoped with relation to the plate $h$ to permit access to the boxes below the plate $g$. As heretofore stated, the flanges $h'$ and $i'$ will prevent movement of the plate $h$ with the plate $g$ while the wagon is loaded. The load is similarly removed from the plate $h$ and from beneath this plate, both plates $g$ and $h$ being telescoped with relation to the plate $i$ after removing the load from said plate $h$. This permits the driver to have free access to the portion of the load upon and beneath the plate $i$, all three plates being turned upwardly if desired, when removing the load from beneath the plate $i$.

The construction heretofore described not only thus greatly facilitates the loading and unloading of a wagon, but the use of the flexible chain $j$ prevents the removal of any plate from the wagon while permitting the free telescoping action both in loading and unloading same.

The installation of these plates is simple, and their use ensures sanitary conditions since they cannot be brought into contact with dirt upon the streets, which may occur when boards are used to separate the upper and lower tiers of boxes constituting the load. Furthermore by the folding of the plates upwardly as shown in dotted lines in Fig. 2, the body of the wagon may be used for carrying barrels, or other materials having larger bulk than the ordinary bread and cake boxes, while giving the full capacity of the wagon body for this purpose.

It is not my intention to limit the invention to the precise details of construction shown in the drawings, it being apparent that such may be varied without departing from the spirit and scope of the invention.

Having described the invention, what I claim as new and desire to have protected by Letters Patent, is:—

1. A delivery wagon embodying therein a body having a closed bottom, sides and top, runways extending horizontally from adjacent the front to adjacent the rear of said body, above the bottom and within and adjacent opposite sides thereof, means for supporting a load above the bottom of the wagon body comprising a plurality of flat plates slidable upon said runways, each plate overlapping and resting upon the adjacent plate toward the rear of the wagon body, a flexible member attached to the front of the wagon body and engaging said plates respectively, whereby movement of the rearward of said plates rearwardly of the wagon body will cause movement of the adjacent plate, and a flat plate nonslidably supported within the wagon body, said flexible member preventing removal of said slidable plates and permitting them to be telescoped in relation to each other and to said non-slidable plate.

2. A delivery wagon embodying therein a body having a closed bottom, sides and top, runways extending horizontally from adjacent the front to adjacent the rear of said body above the bottom and within and adjacent the opposite sides thereof, means for supporting a load above the bottom of the wagon body comprising a plurality of flat plates slidable upon said runways, each plate overlapping and resting upon the adjacent plate toward the rear of the wagon body, a flexible member attached to the front of the wagon body and engaging said plates respectively, whereby movement of the rearward of said plates rearwardly of the wagon body will cause movement of the adjacent plate, a flat plate nonslidably supported within the wagon body, means whereby said nonslidable plate is hinged in relation to the wagon body, the flexible member preventing removal of said slidable plates and permitting them to be telescoped in relation to each other and to said nonslidable plate and to have movement with said slidable plates upon its hinges, and a latch member adapted to hold said plates when they have been moved about the hinges of said nonslidable plate.

3. A delivery wagon embodying therein a body having a closed bottom, sides and top, runways extending horizontally from adjacent the front to adjacent the rear of said body above the bottom and within and adjacent the opposite sides thereof, means for supporting a load above the bottom of the wagon body comprising a plurality of flat plates slidable upon said runways, each plate overlapping and resting upon the adjacent plate toward the rear of the wagon body, the underlying portion of each of said slidable plates having a downturned flange having an opening therethrough, a flexible member attached to the front of the wagon body and passing through the openings in said flanges respectively, stops carried by said flexible member in engaging relation with said downturned flanges, whereby movement of the rearward of said plates rearwardly of the wagon body will cause movement of the adjacent plate, and a flat plate nonslidably supported within the wagon body, said flexible member preventing removal of said slidable plates and permitting them to be telescoped in relation to each other and to said nonslidable plate.

4. A delivery wagon embodying therein a body having a closed bottom, sides and top, runways extending horizontally from adjacent the front to adjacent the rear of said body above the bottom and within and adjacent the opposite sides thereof, means for supporting a load above the bottom of the wagon body comprising a plurality of flat plates slidable upon said runways, each plate overlapping and resting upon the adjacent plate toward the rear of the wagon body, the underlying portion of each of said slidable plates having a downturned flange having an opening therethrough, a flexible member attached to the front of the wagon body and passing through the openings in said flanges respectively, stops carried by said flexible member in engaging relation with said downturned flanges, whereby movement of the rearward of said plates rearwardly of the wagon body will cause movement of the adjacent plate, a flat plate nonslidably supported within the wagon body, means whereby said nonslidable plate is hinged in relation to the wagon body, said flexible member preventing removal of said slidable plates and permitting them to be telescoped in relation to each other and to said nonslidable plate and to have movement with said nonslidable plate upon its hinges, and a latch member adapted to hold said plates when they have been moved about the hinges of said nonslidable plate.

5. A delivery wagon embodying therein a body having a closed bottom, sides and top, runways extending from adjacent the front to adjacent the rear of said body above the bottom and within and adjacent the opposite sides thereof, said runways being formed of angle iron, one of the flanges of which extends horizontally, and the vertical flanges of which extend beyond, and are turned at an angle across said horizontal flange, means for supporting a load above the bottom of the wagon body comprising a plurality of flat plates slidable upon said runways, each plate overlapping and resting upon the adjacent plate toward the rear of the wagon, a flexible member attached to the front of the wagon body and engaging said plates respectively, whereby movement of the rearward of said plates rearwardly of the wagon body will cause movement of the adjacent plate, and a flat plate nonslidably supported within the wagon body, said flexible member preventing removal of said slidable plates in relation to each other and to said nonslidable plate.

6. A delivery wagon embodying therein a body having a closed bottom, sides and top, runways extending horizontally from adjacent the front to adjacent the rear of said body, above the bottom and within and adjacent the opposite sides thereof, means for supporting a load above the bottom of the wagon body comprising a plurality of flat plates slidable upon said runways, each plate overlapping and resting upon the adjacent plate toward the rear of the wagon, a flat plate nonslidably supported within the wagon body, and means maintaining said plates respectively in operative relation to each other and to the wagon body, whereby the removal of any of said plates from said body is prevented, but movement of said slidable plates is permitted, the lowermost slidable plate having downturned flanges along the forward and rear edges thereof, said nonslidable plate having two upturned flanges, and the intermediate slidable plate having a downturned flange along the edge thereof towards said nonslidable plate, and an upturned flange adjacent the other edge thereof.

7. A delivery wagon embodying therein a body having a closed bottom, sides and top, runways extending horizontally from adjacent the front to adjacent the rear of said body, above the bottom and within and adjacent the opposite sides thereof, means for supporting a load above the bottom of the wagon body comprising a plurality of flat plates slidable upon said runways, each plate overlapping and resting upon the adjacent plate toward the rear of the wagon, a flat plate nonslidably supported within the wagon body, and means maintaining said plates respectively in operative relation to each other and to the wagon body, whereby the removal of any of said plates from said body is prevented, but movement of said slidable plates in relation to each other and to said nonslidable plate is permitted, the lowermost slidable plate having downturned flanges along the forward and rear edges thereof, said nonslidable plate having two upturned flanges, and the intermediate slidable plate having a downturned flange along the edge thereof towards said nonslidable plate, and an upturned flange adjacent the other edge thereof, means whereby said nonslidable plate is hinged in relation to said wagon body, said slidable plates when moved adjacent said nonslidable plate being movable therewith about said last named means, and a latch member adapted to hold said plates when they have been moved about the hinges of said nonslidable plate.

8. A delivery wagon embodying therein a body having a closed bottom, sides and top, runways extending horizontally from adjacent the front to adjacent the rear of said body, above the bottom and within and adjacent the opposite sides thereof, means for supporting a load above the bottom of the wagon body comprising a plurality of flat plates slidable upon said runways, each plate overlapping and resting upon the adjacent plate toward the rear of the wagon, a flat plate nonslidably supported within the wagon body, the lowermost slidable plate having downturned flanges along the forward and rear edges thereof, said nonslidable plate having two upturned flanges, and the intermediate slidable plate having a downturned flange along the edge thereof towards said nonslidable plate, and an upturned flange adjacent the other edge thereof, the downturned flanges on said movable plates having openings therethrough, a flexible connection secured to the wagon body adjacent the nonslidable plate and passing through the openings in said flanges respectively, and stops carried by said flexible member in engaging relation with said flanges respectively.

9. A delivery wagon embodying therein a body having a closed bottom, sides and top, runways extending from adjacent the front to adjacent the rear of said body, above the bottom and within and adjacent the opposite sides thereof, said runways being formed of angle iron, one of the flanges of which extends horizontally, and the vertical flanges of which extend beyond, and are turned at an angle across said horizontal flange, means for supporting a load above the bottom of the wagon body comprising a plurality of flat plates slidable upon said runways, each plate overlapping and resting upon the adjacent plate toward the rear of the wagon, a flat plate nonslidably supported within the wagon body, the lowermost slidable plate having downturned flanges along the forward and rear edges thereof, said nonslidable plate having two upturned flanges, and the intermediate slidable plate having a downturned flange along the edge thereof towards said nonslidable plate, and an upturned flange adjacent the other edge thereof, the downturned flanges on said movable plates having openings therethrough, a flexible connection secured to the wagon body adjacent the nonslidable plate and passing through the openings in said flanges respectively, and stops carried by said flexible member in engaging relation with said flanges respectively.

10. A delivery wagon embodying therein a body having a closed bottom, sides and top, runways extending from adjacent the front to adjacent the rear of said body, above the bottom and within and adjacent the opposite side thereof, said runways being formed of angle iron, one of the flanges of which extends horizontally, and the vertical flanges of which extend beyond, and are turned at an angle across said horizontal flange, means for supporting a load above the bottom of the wagon body comprising a plurality of flat plates slidable upon said runways, each plate overlapping and resting upon the adjacent plate toward the rear of the wagon, a flat plate nonslidably supported within the wagon body, the lowermost slidable plate having downturned flanges along the forward and rear edges thereof, said non-slidable plate having two upturned flanges, and the intermediate slidable plate having a downturned flange along the edge thereof towards said non-slidable plate, and an upturned flange adjacent the other edge thereof, the downturned flanges on said movable plates having openings therethrough, a flexible connection secured to the wagon body adjacent the non-slidable plate and passing through the openings in said flanges respectively, stops carried by said flexible member in engaging relation with said flanges respectively, means whereby said non-slidable plate is hinged in relation to the wagon body, said flexible member preventing removal of said slidable plates and permitting them to be telescoped in relation to each other and to said non-slidable plate and a latch member to hold said plates when they have been moved about said last named means.

In witness whereof I have hereunto affixed my signature, this 4th day of December, 1924.

CHARLES W. PEELLE.